(12) United States Patent
Graham, III et al.

(10) Patent No.: US 8,326,577 B2
(45) Date of Patent: Dec. 4, 2012

(54) SYSTEM AND METHOD FOR PREDICTING WIND TURBINE COMPONENT FAILURES

(75) Inventors: Fred Gorum Graham, III, Greenville, SC (US); Subrat Nanda, Niskayuna, NY (US); Sameer Vittal, Marietta, GA (US); Atanu Talukdar, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/237,073

(22) Filed: Sep. 20, 2011

(65) Prior Publication Data
US 2012/0143565 A1 Jun. 7, 2012

(51) Int. Cl.
*G06F 17/18* (2006.01)
(52) U.S. Cl. ...................................... 702/181
(58) Field of Classification Search .................. 702/181, 702/34; 416/41, 44, 61
See application file for complete search history.

(56) References Cited

U.S. PATENT DOCUMENTS

| | | | |
|---|---|---|---|
| 7,627,454 B2 * | 12/2009 | LaComb et al. | 702/182 |
| 7,832,980 B2 | 11/2010 | Demtroder et al. | |
| 2008/0141072 A1 | 6/2008 | Kalgren et al. | |
| 2008/0177756 A1 * | 7/2008 | Kosche et al. | 707/100 |
| 2008/0277687 A1 | 11/2008 | Kojori et al. | |

FOREIGN PATENT DOCUMENTS
WO 2008036921 A2 3/2008

OTHER PUBLICATIONS

Goodman et al., Prognostic Techniques for Semiconductor Failure Modes, Ridgetop Group, Inc., Tucson, AZ, 2000.
Kusiak et al., Prediction of Status Patterns of Wind Turbines: A Data-Mining Approach, Journal of Solar Energy Engineering, vol. 133, Feb. 2011.
Boodhansingh et al., "Power Supply Health Management—Deploying Prognostics Technology for Enhanced Weapon System Depot Support," IEEE Autotestcon 2008, Salt Lake City, UT, Sep. 8-11, 2008 (6 pgs).
Goodman et al., "Electronic prognostics for switched mode power supplies," Microelectronics Reliability 47 (2007) pp. 1902-1906.
Rahimo et al., "Freewheeling Diode Reverse Recovery Failure Modes in IGBT Applications," IEEE, Mar./Apr. 2001, pp. 1-10.
Won-suk Choi and Sungmo Young, "AN-9067: Analysis of MOSFET Failure Modes in LLC Resonant Converter," 2009 Fairchild Semiconductor Corporation, www.fairchildsemi.com, pp. 1-12.
Kumar et al., "Parameter selection for health monitoring of electronic products," Microelectronics Reliability 2009, doi:10.1016/j.microrel.2009.09.016, pp. 1-8.

(Continued)

*Primary Examiner* — Bryan Bui
(74) *Attorney, Agent, or Firm* — James McGinness, Esq.; Armstrong Teasdale LLP

(57) ABSTRACT

Methods and systems for use in predicting wind turbine failures are provided. One example method includes determining a parametric profile for a component of a wind turbine from operating data of a plurality of wind turbines, determining an anomaly profile for the component of the wind turbine from anomaly alerts from a plurality of wind turbines, and determining a probability of failure for the component of the wind turbine based on the parametric profile and the anomaly profile. The parametric profile defines at least one parametric event associated with the component prior to failure of the component, and the anomaly profile defines at least one anomaly associated with the component prior to failure of the component.

20 Claims, 5 Drawing Sheets

OTHER PUBLICATIONS

Cheng et al., "A Fusion Prognostics Method for Remaining Useful Life Prediction of Electronic Products," 5th Annual IEEE Conference on Automation Science and Engineering, Bangalore, India, Aug. 22-25, 2009, pp. 102-107.

Patil et al., "Identification of Failure Precursor Parameters for Insulated Gate Bipolar Transistors (IGBTs)", 2008 International Conference on Prognostics and Health Management, IEEE 2008 (5 pgs).

Goodman et al., "Practical Application of PHM/Prognostics to COTS Power Converters," Aerospace Conference, 2005 IEEE, Mar. 5-12, 2005, pp. 3573-3578.

Sundstrom et al., "Prognostics of Electronic Systems through Power Supply Current Trends," IEEE International Conference on Prognostics and Health Management, 2008.

* cited by examiner

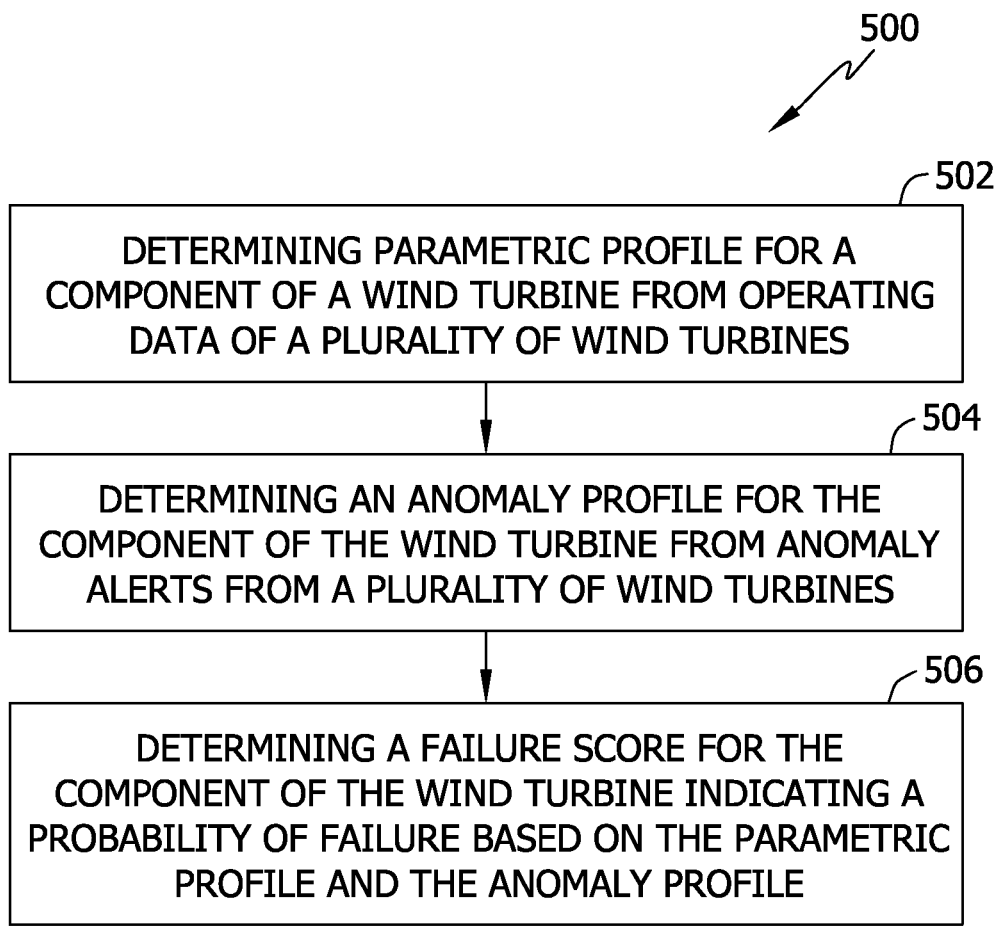

SYSTEM AND METHOD FOR PREDICTING WIND TURBINE COMPONENT FAILURES

BACKGROUND OF THE INVENTION

The subject matter described herein relates generally to wind turbines and, more particularly, to predicting wind turbine component failures.

Wind turbines are known to be located in various settings suitable to capture wind energy. Wind turbines generally provide variable performance based on environmental conditions associated with the wind turbines during operation, as well as fitness of the wind turbines to function properly. Wind turbines often utilize sensors to monitor wind turbine performance and wind turbine components during operation. At least some of these sensors may be used to detect malfunctions of the wind turbines.

Often, malfunctions require that the wind turbine be shut down, inspected, and/or reset. The logistics of sending a team to the wind turbine may be onerous given the location of the wind turbine, such as at a height unreachable without specific equipment and/or positioned out at sea. In addition, downtime associated with inspection and/or repair of the wind turbine inhibits its ability to generate energy. Accordingly, once a wind turbine fails, it may take several days and/or weeks to organize the appropriate equipment and/or parts to return the wind turbine to working order.

BRIEF DESCRIPTION OF THE INVENTION

In one aspect, a method for use in predicting a wind turbine component failure is provided. The method includes determining, at a computing device, a parametric profile for a component of a wind turbine from operating data of a plurality of wind turbines. The parametric profile defines at least one parametric event associated with the component prior to failure of the component. The method includes determining, at the computing device, an anomaly profile for the component of the wind turbine from anomaly alerts generated by a plurality of wind turbines. The anomaly profile defines at least one anomaly associated with the component prior to failure of the component. The method includes determining a probability of failure for the component of the wind turbine based on the parametric profile and the anomaly profile.

In another aspect, a data analyzer for use in predicting a wind turbine component failure is provided. The data analyzer includes a database including operating data for a plurality of wind turbines and anomaly alerts for a plurality of wind turbines and a processing device coupled to the database. The processing device configured to determine a parametric profile for a component of a wind turbine from the operating data, determine an anomaly profile for the component of the wind turbine from the anomaly alerts, and determine a probability of failure for the component of the wind turbine based on the parametric profile and the anomaly profile. The parametric profile defines at least one parametric event associated with the component prior to failure of the component. The anomaly profile defines at least one anomaly associated with the component prior to failure of the component.

In yet another aspect, one or more computer-readable storage media having computer executable instructions embodied thereon is provided. The computer executable instructions cause the at least one processing device to determine a parametric profile for a component of a wind turbine from operating data of a plurality of wind turbines, determine an anomaly profile for the component of the wind turbine from anomaly alerts generated from a plurality of wind turbines, and determine a probability of failure for the component of the wind turbine based on the parametric profile and the anomaly profile. The parametric profile defines at least one parametric event associated with the component prior to failure of the component. The anomaly profile defines at least one anomaly associated with the component prior to failure of the component.

BRIEF DESCRIPTION OF THE DRAWINGS

FIG. 5 is a flowchart of an exemplary method for use in predicting a wind turbine component failure.

DETAILED DESCRIPTION OF THE INVENTION

The embodiments described herein facilitate predicting a wind turbine component failure.

Figure 1:
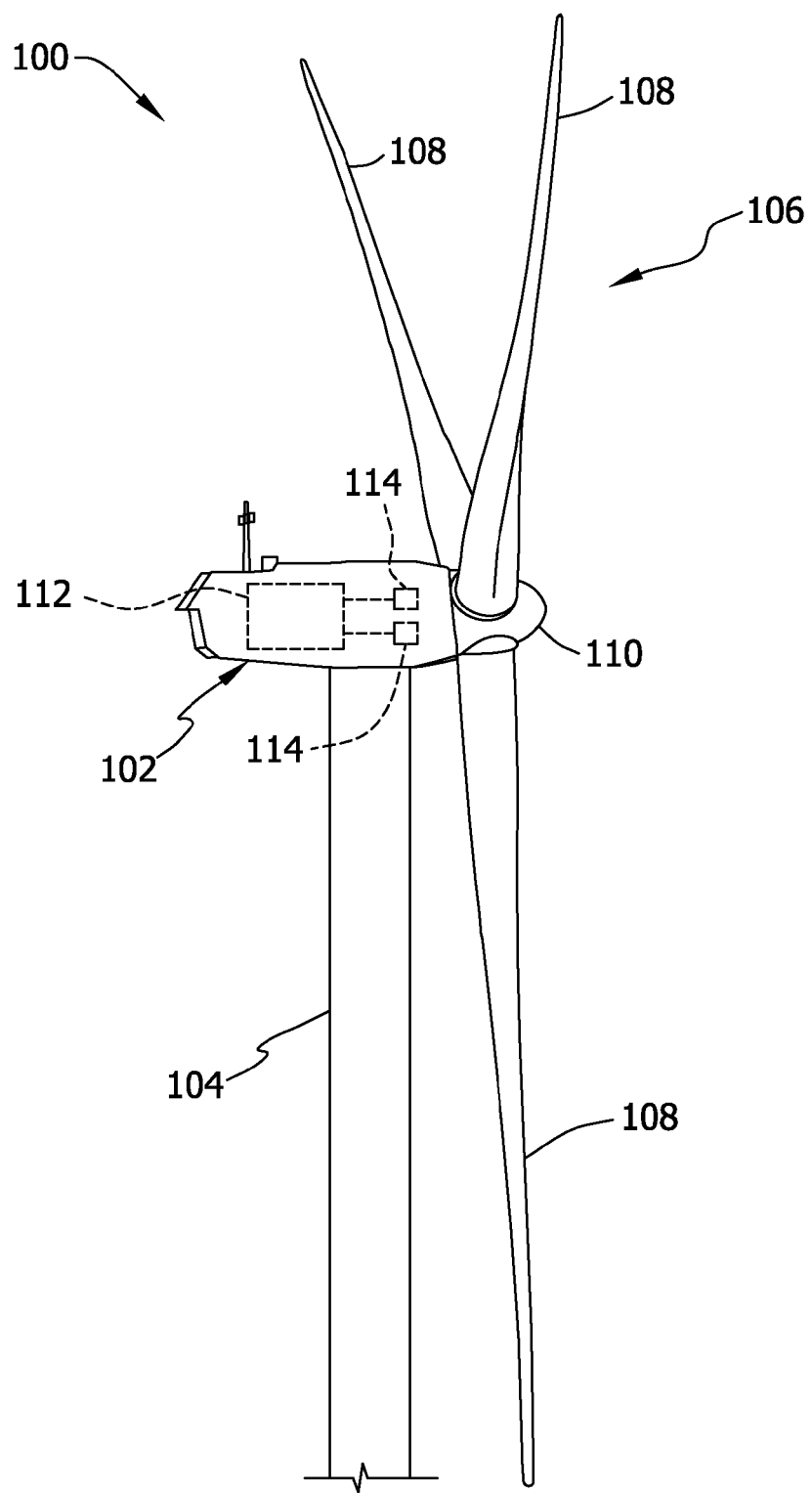
FIG. 1 is a perspective view of an exemplary wind turbine.

FIG. 1 is a perspective view of an exemplary wind turbine 100, including a nacelle 102 that houses a generator (not shown in FIG. 1). Nacelle 102 is mounted on a tower 104 (only a portion of tower 104 is shown in FIG. 1) that tower 104 may have any suitable height to facilitate operation of wind turbine 100 as described herein. In an exemplary embodiment, wind turbine 100 also includes a rotor 106 having three rotor blades 108 coupled to a rotating hub 110. Alternatively, wind turbine 100 may include any number of rotor blades 108 that enable operation of wind turbine 100 as described herein. In an exemplary embodiment, wind turbine 100 includes a gearbox (not shown) that is rotatingly coupled to rotor 106 and to the generator.

In some embodiments, wind turbine 100 includes a controller 112 and one or more sensors 114. Sensors 114 provide operating data about turbine 100. In one embodiment, sensor(s) 114 include one or more of a wind speed and/or a direction sensor (e.g., an anemometer), an ambient air temperature sensor, a component temperature sensor, a controller temperature sensor, an air density sensor, an atmospheric pressure sensor, a humidity sensor, a rotor torque sensor, a voltage sensor, a current sensor, a power sensor, a blade pitch angle sensor, a rotor speed sensor, and/or other sensor suitable for use with wind turbine 100. Sensors 114 sense operating parameters at the turbine-level, such as rotor speed, and/or at a component-level, such as a voltage across a switching device. A component may include any subassembly of turbine 100. For example, controller 112 may be a component, while a switching device within controller 112 may be a component.

Each sensor 114 is located according to its function. For example, an anemometer may be positioned on an outside surface of nacelle 102, such that the anemometer is exposed to air surrounding wind turbine 100. Each sensor 114 generates and transmits one or more signals corresponding to a detected operating condition. Moreover, each sensor 114 may transmit a signal continuously, periodically, or only once, for example, though other signal timings are also contemplated. Sensors 114 are coupled to controller 112, and controller 112 receives operating data from each of sensors 114. Moreover, controller 112 is configured to control an operation of wind turbine 100 and may include, without limitation, a brake, a relay, a motor, a solenoid, and/or a servomechanism. Further, controller 112 may be configured to adjust a physical configuration of wind turbine 100, such as an angle or pitch of rotor blades 108 and/or an orientation of nacelle 102 or rotor 106 with respect to tower 104.

Figure 2:
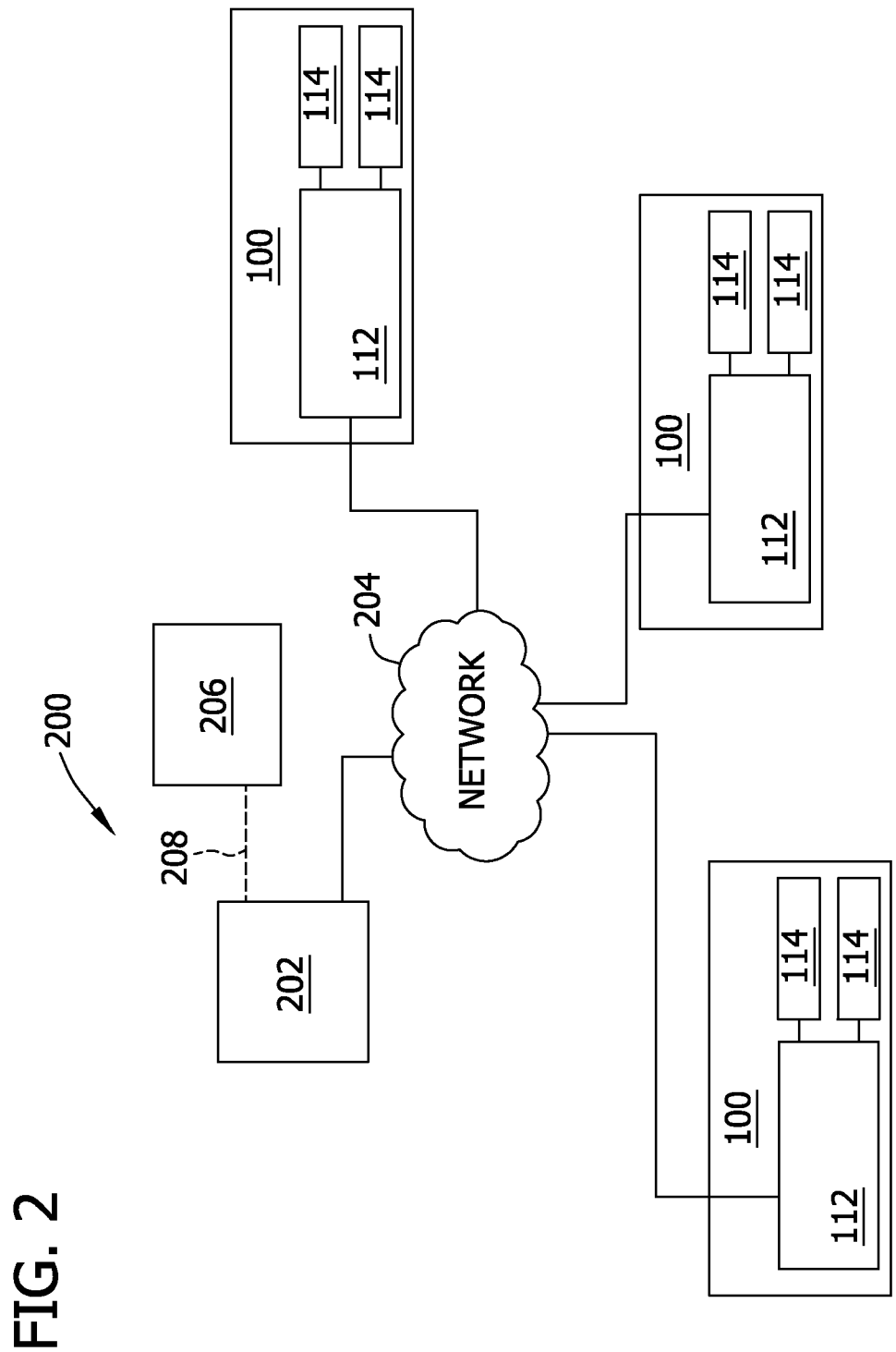
FIG. 2 is a block diagram illustrating an exemplary turbine farm system.

FIG. 2 illustrates an exemplary turbine farm system 200. In the exemplary embodiment, turbine farm system 200 includes multiple wind turbines 100. Turbine farm system 200 includes a system monitor 202 coupled to each of wind turbines 100. System monitor 202 monitors and/or controls each of wind turbines 100. For example, system monitor 202 may include a supervisory control and data acquisition (SCADA) system. System monitor 202 is coupled to each of wind turbines 100 through network 204. Network 204 may include, without limitation, the Internet, a local area network (LAN), a wide area network (WAN), a wireless LAN, a mesh network, and/or a virtual private network (VPN).

Turbine farm system 200 includes data analyzer 206. In the exemplary embodiment, data analyzer 206 is communicatively coupled to system monitor 202. For example, data analyzer 206 may be connected directly to system monitor 202 through communication channel 208 and/or connected to system monitor 202 through a network, such as network 204. Alternatively, data analyzer 206 may be segregated from system monitor 202, such that data transfer requires physically transferring a removable computer-readable media, such as a flash drive or CD-ROM, between data analyzer 206 and system monitor 202.

Figure 3:
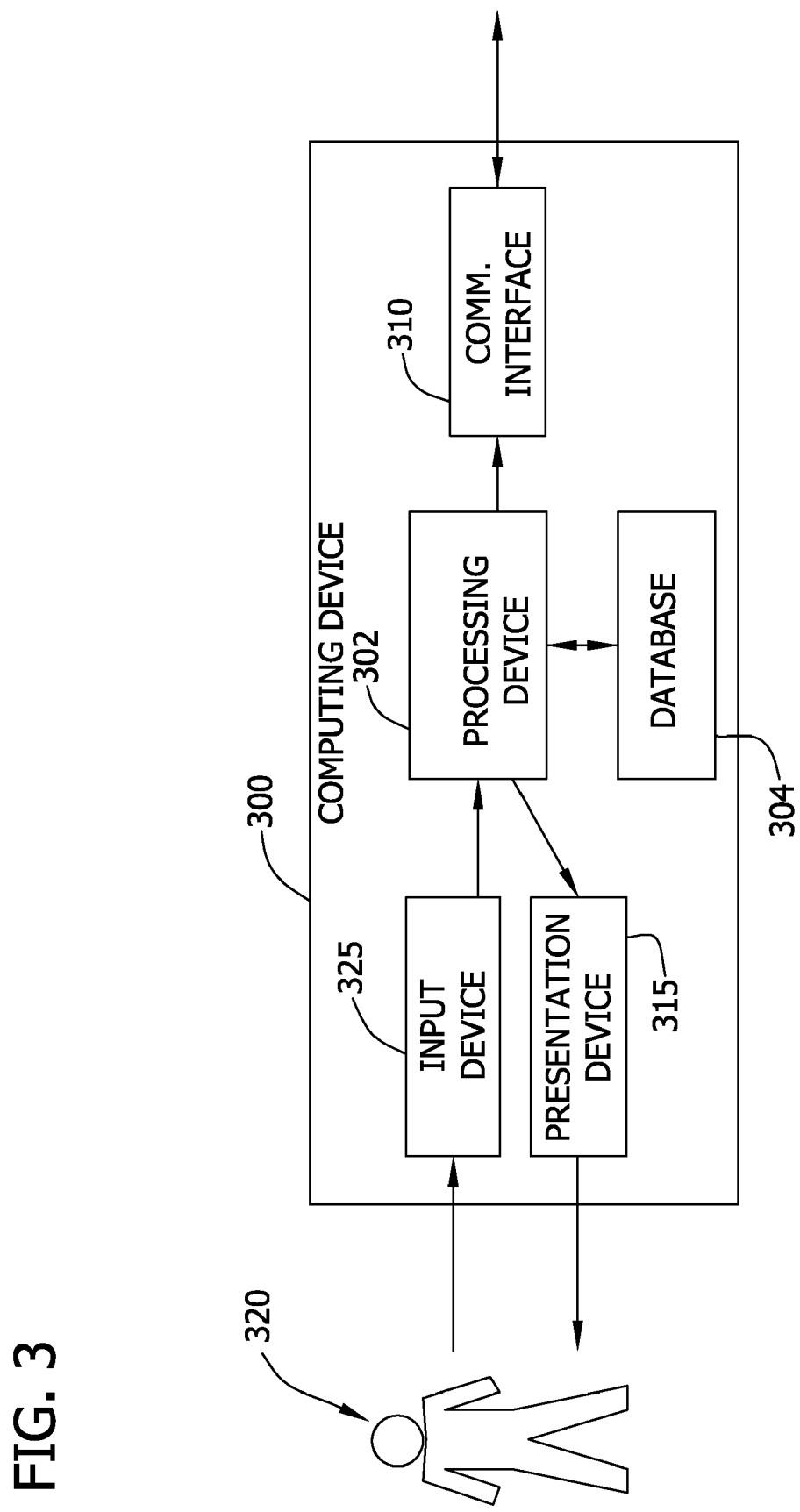
FIG. 3 is a block diagram illustrating an exemplary computing device.

FIG. 3 illustrates an exemplary computing device 300. In the exemplary embodiment, each of system monitor 202 and data analyzer 206 are separate computing devices 300. In at least one embodiment, system monitor 202 and data analyzer 206 may be incorporated into one computing device 300. Computing device 300 includes a processing device 302 and a database 304 coupled to processing device 302. Processing device 302 may include any processing unit, such as, without limitation, a central processing unit (CPU), an integrated circuit (IC), an application specific integrated circuit (ASIC), a microcomputer, a microcontroller, a programmable logic device (PLD), and/or any other programmable circuit. A processor may include multiple processing units (e.g., in a multi-core configuration).

Database 304 is any device allowing information, such as executable instructions for processing device 302 and/or other data, to be stored and retrieved. A database may include, without limitation, one or more random access memory (RAM) devices, read only memory (ROM) devices, hard drive devices, flash memories, optical devices, and/or other computer-readable media. Stored in database 304 are, for example, computer-readable instructions for generating one or more profiles and/or probabilities of failure. In addition, or alternatively, database 304 may be configured to store operating data transmitted from one or more of turbines 100, anomaly alerts transmitted from one or more of turbines 100, and/or any other data suitable for use with the methods described herein.

Computing device 300 includes a communication interface 310 that allows processing device 302 to communicate with network 204 and/or other computing devices 300 in communication with network 204. Additionally, a removable computer-readable media, such as a flash drive, CD-Rom, etc., may communicate with processing device 302 directly or via communication interface 310.

In some embodiments, computing device 300 includes at least one presentation device 315 for presenting information to operator 320. Presentation device 315 is any component capable of conveying information to operator 320. Presentation device 315 may include, without limitation, a display device (e.g., a liquid crystal display (LCD), an organic light emitting diode (OLED) display, or "electronic ink" display) and/or an audio output device (e.g., a speaker or headphones). In some embodiments, presentation device 315 is configured to present wind turbine information, such as the possible and/or actual power output of one or more wind turbines 100 (shown in FIG. 1) to operator 320.

In some embodiments, computing device 300 includes an input device 325 for receiving input from operator 320. Input device 325 may include, for example, a keyboard, a pointing device, a mouse, a touch sensitive panel (e.g., a touch pad or a touch screen), and/or other suitable input devices for receiving one or more inputs from operator 320. A single component, such as a touch screen, may function as both an output device of presentation device 315 and input device 325.

In the exemplary embodiment, database 304 includes operating data and anomaly alerts. The operating data and/or anomaly alerts may be generated by one or more of wind turbines 100. More specifically, operating data includes any parameters sensed and/or measured by sensors 114, as described above. Parameters may include, without limitation, phase voltage, phase current, power, wind speed, torque, temperatures, etc. In the exemplary embodiment, operating data is transmitted from each of wind turbines 100 to system monitor 202, via network 204, and stored in database 304. Operating data may be transmitted from wind turbines 100 in various intervals and/or in real time. Specifically, for example, operating data may be received from one or more of sensors 114 and transmitted from controller 112 to system monitor 202 in intervals of, without limitation, about 10 minutes, about 5 minutes, about 1 minute, about 30 seconds, or about 10 seconds and/or other suitable intervals depending, for example on the type of network 204 and/or the number of turbines 100 coupled to system monitor 202.

In addition to operating data, anomaly alerts may be generated and transmitted from one or more of wind turbines 100 to system monitor 202. In general, an anomaly alert is generated when a parameter of turbine 100 falls outside of an expected range and/or violates a minimum/maximum expected value. Anomaly alerts may be stored in database 304 and may include, without limitation, a torque deviation, a line fault voltage, a fault current, a line fault frequency, an asymmetric generator current, a cabinet over temperature warning, grid voltage drop, feedback error circuit breaker, or other anomalies in the operation of wind turbine 100. Operating data and/or anomaly alerts stored in database 304 may be transmitted to data analyzer 206 in various suitable manners, such as via network 204, another network, and/or a computer-readable media, etc.

During operation, processing device 302 determines a parametric profile for a component of wind turbine 100 from operating data of a plurality of wind turbines stored in database 304. The parametric profile defines one or more parametric events associated with the component prior to failure of the component. As such, processing device 302 utilizes operating data related to parameters of components of wind turbines, such as, without limitation, a temperature associated with the component, a voltage and/or current associated with the component, etc., to identify a parametric event preceding historical failures of the component of wind turbine 100 to predict a failure of the component of wind turbine 100.

In some embodiments, when processing device 302 determines the parametric profile, processing device 302 selects a component associated with a particular failure of wind turbine 100. More specifically, several wind turbine failures may be reduced into discrete component failures, such as electronic component failures, through a "fish-bone" analysis of the components, failures, and/or parameters. In one example, a failed rectifier circuit within controller 112 may cause a failure of wind turbine 100 (i.e., shutdown and/or reduction in power production, etc.). In another example, a cracked capacitor within controller 112 may cause a failure of wind turbine 100. Often, the failed component provides indicators of failure prior to actual failure. More specifically, operating data of turbine 100 may deviate from an expected value or range prior to failure of one or more components of turbine 100. The systems described herein, in some embodiments, select the component associated with the deviation to determine the parametric profile.

In the exemplary embodiment, selecting a component may be selected based on failure rates for the particular component. For example, if an insulated gate bi-polar transistor (IGBT) failure accounts for 4% of the turbine failures and 4% is high relative to other known failures, the IGBT may be selected by processing device 302 and/or operator 320 of data analyzer 206 as a component of interest. Moreover, the operating data and/or domain knowledge related to wind turbines 100 may identify a relevant portion of the operating data associated with the IGBT, such as operating voltage, switching types, current flow and/or switching speed, etc. It should be apparent that one or more other components of turbine 100 may include different parameters of interest usable to determine a parametric profile.

Figure 4:
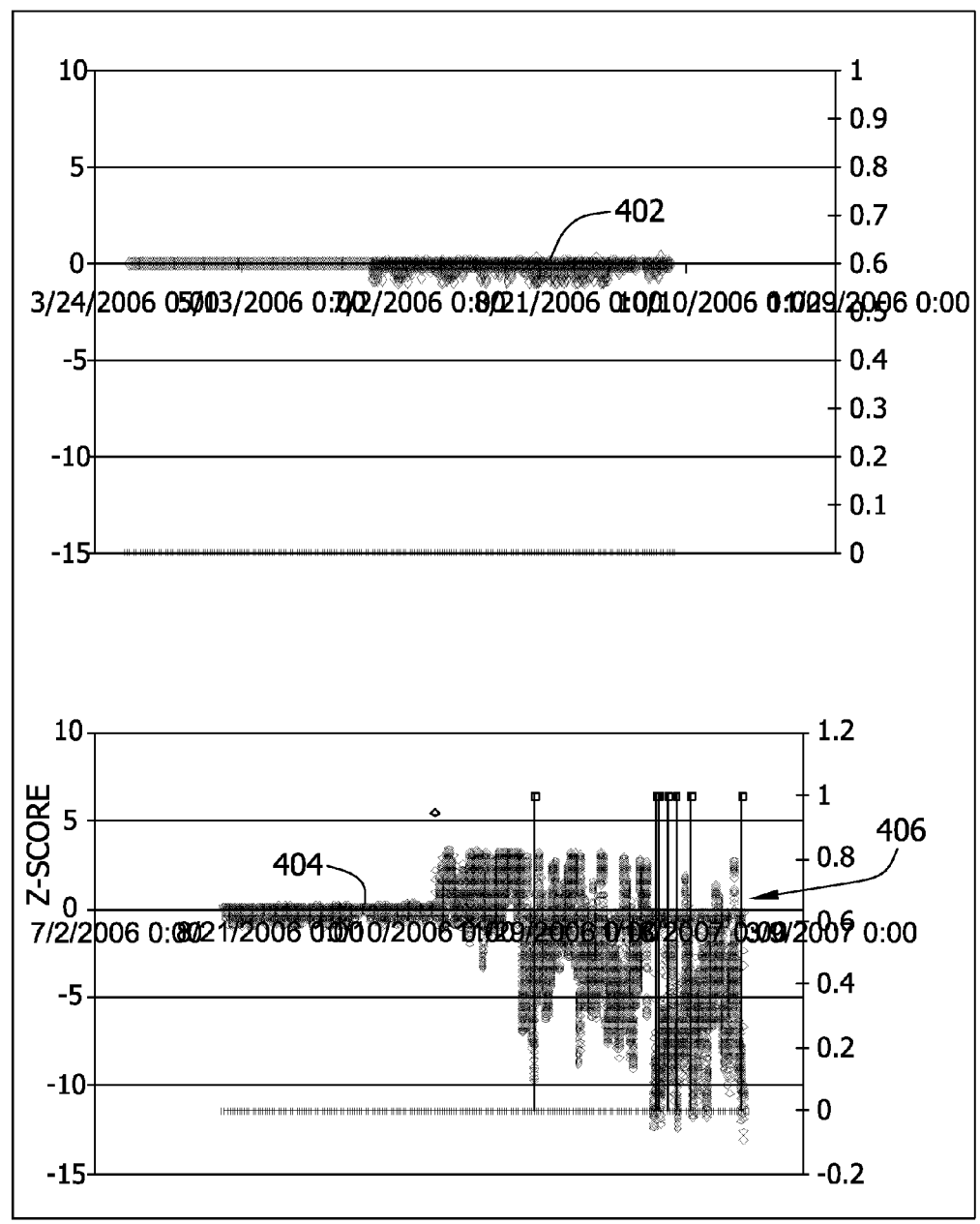
FIG. 4 is a graph illustrating torque output of a functional wind turbine, such as the wind turbine shown in FIG. 1, relative to torque output of a failing wind turbine.

Once the component and operating data have been selected by processing device 302 and/or operator 320, processing device 302 analyzes the operating data to identify the parametric profile. Specifically, for example, processing device 302 may employ various statistical tools to identify a parametric profile. In one example, the operating data includes actual torque for turbine 100 and an expected torque for turbine 100. Processing device 302 may calculate a z-score for the relationship between the actual torque and the expected torque over time. FIG. 4 illustrates a graph 400 of the z-score 402 for turbine 100 under normal operation. FIG. 4 further illustrates a z-score 404 for turbine 100 during failure. As shown, z-score 402 deviates about 1.51, indicating a minimal difference between the actual torque and the set point torque. Conversely, z-score 404 defines a growing deviation ranging up to about 18.57, indicating the deviation between the actual torque and the expected torque just prior to failure of turbine 100 at point 406. As should be apparent, various different statistical tools may be employed to compare various types of operating data to expected values/ranges and/or other operating data. The types of parameters selected may be iterated to increase accuracy and efficiency of a parametric profile. For example, processing device 302 may compare actual torque to wind speed, power output to wind speed, different phase currents, internal temperature to ambient temperature, phase voltages, or other combination of parameters suitable to predict component failures.

In various embodiments, domain knowledge may be used to assist in identifying a parametric profile. More specifically, domain knowledge may be used to provide expected values and/or set point values for analyzing the operating data. Domain knowledge may include, without limitation, expert knowledge of a theoretical operation of wind turbine 100, three-phase electricity generation, turbine response to specific environmental conditions, etc. In the example above, domain knowledge may be used to determine the expected torque for the wind turbine 100 under the appropriate conditions to gauge the actual torque of turbine 100 under those conditions.

Operating data may be analyzed relative to a set point value to determine the parametric profile. In the exemplary embodiment, processing device 302 may analyze the operating data relative to the set point value to detect whether the component and/or wind turbine 100 is deviating from the set point. Specifically, if the operating data overshoots/undershoots the set point value prior to failure of turbine 100, the overshooting/undershooting of the set point value may be determined as at least a portion of a parametric profile. In such an example, a parametric event of the parametric profile may include overshooting/undershooting the set point value.

It should be appreciated that various different operations may be performed to determine a parametric profile including at least one parametric event. In several embodiments, processing device 302 compares one portion of operating data to another portion of the operating data to determine a parametric profile. Specifically, for example, processing device 302 may determine a parametric profile based on a comparison and/or analysis of torque versus wind speed, power versus wind speed, phase current differences, coolant temperature versus ambient temperature, phase voltage variations, etc.

Additionally, in the exemplary embodiment, operating data may be analyzed based on a status of turbine 100. More specifically, operating data may include a designation of status for turbine 100, such as not running mode, startup mode, power producing mode, shutdown mode, etc. Operating data may be analyzed differently depending on a particular status of turbine 100. In one example, a torque deviation during a startup mode may be ignored, while a torque deviation during a power producing mode may be analyzed to determine the parametric profile. Accordingly, in various embodiments, processing device 302 may perform one or more processes described herein based on a turbine status of turbine 100. Specifically, in another example, processing device 302 may determine a previous turbine status and/or a present turbine status to analyze power output from turbine 100 relative to wind speed associated with turbine 100.

Further, processing device 302 may validate the parametric profile historical data associated with a plurality of turbines, such as, for example, operating data used to determine the parametric profile. Processing device 302 may discard a parametric profile if a desired accuracy is not achieved. For example, if a parametric profile predicts failures in non-failing turbines at a rate of about 15%, the parametric profile may be discarded. Alternatively, processing device 302 may weight the parametric profile according to its accuracy when determining the probability of failure. The validation of the parametric profile may be employed to inhibit false positives. While repair of turbines 100 may be cumbersome, needless repairs of turbines 100 unnecessarily utilize available repair and/or maintenance resources.

In the exemplary embodiment, processing device 302 determines an anomaly profile for the component of wind turbine 100 from anomaly alerts generated by a plurality of wind turbines 100. The anomaly profile defines at least one anomaly associated with the component prior to failure of the component.

In various embodiments, processing device 302 determines the anomaly profile by filtering anomaly alerts from wind turbines 100 to identify anomalies associated with the component of turbine 100. In the exemplary embodiment, processing device 302 and/or operator 320 uses domain knowledge to associate one or more anomaly alerts to a component of turbine 100. The domain knowledge may include the operational information about the component (e.g., a power converter, rectifier circuit, switching device, etc.), maintenance records, anomaly reports, etc. The anomaly alerts may be associated within multiple components and utilized to determine an anomaly profile for each of the components of turbine 100.

Additionally, or alternatively, processing device 302 may correlate the filter anomalies to determine the anomaly profile. More specifically, device 302 may use, for example, associative rule mining to determine the anomaly profile from the anomaly alerts. It should be appreciated that various analysis tools are available to determine an anomaly profile from the available anomaly alerts determined to be associated with a particular component of turbine 100.

Specifically, in one example, two turbines 100 generate anomaly alerts. First turbine 100 transmits the following anomalies: a restart delay at day 1, a restart delay at day 14, a generator side CCU collective fault at day 14, and a torque deviation at day 15, prior to turbine failure on day 17. Second turbine 100 transmits the following anomalies: a shutdown at day 1, a generator side CCU collective fault at day 23, a torque deviation at day 23, and a line CCU fault current on day 23, prior to turbine failure on day 29. Because each of the two failed turbines issue common anomaly alerts prior to failure, processing device 302 may determine an anomaly profile including the two anomalies. Particularly, in this example, the anomaly profile may include a torque deviation and a generator side CCU collective fault. In another example, an anomaly alert may persist for an interval of time. More specifically, a line fault frequency alert may persist for two days, without resolution by turbine restart. In such an example, processing device 302 may determine an anomaly profile including a persistence line fault frequency alert. It should be appreciated that the number and/or type of anomalies included in an anomaly profile may be different in other embodiments.

In the exemplary embodiment, processing device 302 may further validate the anomaly profile against the anomaly alerts to determine a validation score. The validation score may indicate the accuracy of the anomaly profile, i.e., the number of false positives. The anomaly profile may be discarded if the validation score exceeds a predetermined value. Alternatively, the validation score may be used by processing device 302 to weight the anomaly profile according to its accuracy when determining the probability of failure.

When processing device 302 has determined the parametric profile and the anomaly profiles, processing device 302 is configured to determine a probability of failure for the component of wind turbine 100 based on the parametric profile and the anomaly profile. The probability of failure may include a likelihood of a failure and/or a predicted timing of a failure. In this manner, a probability of failure is provided for a component of wind turbine 100, when the parametric events and/or the anomalies occur, such that an operator of wind turbine 100 may pre-plan for failure of wind turbine 100 to minimize and/or eliminate down time of wind turbine 100 due to a failure associated with the component.

One or more probabilities of failure may be incorporated into system monitor 202. Specifically, for example, probabilities of failure may be coded and/or converted into one or more SQL queries. The SQL queries may be called by a SCADA component or incorporated into a SCADA component of system monitor 202. The SQL queries may be run continuously, periodically, and/or upon operator request to determine if one of more parametric events and/or anomalies upon which the probability of failure is based has occurred.

More specifically, when system monitor 202 recognizes occurrence of one or more parametric events and anomalies indicative of the parametric profile and anomaly profiles, system monitor 202 may assign the probability of failure to wind turbine 100. Depending on the severity of the probability of failure an operator at system monitor 202 may initiate a procedure to procure maintenance for the turbine 100. As indicated above, the operator may be able to minimize and/or eliminate down time of wind turbine 100 due to a failure associated with the component. In this manner, data analyzer 206 provides improved reliability, availability and maintainability of wind turbines 100, and consequently, turbine farm system 200. More particularly, the systems and methods described herein may permit an operator of turbine farm system 200 to plan outages, maintenance activities, spare parts inventories, and personnel in advance of wind turbine failures, while reducing down time associated with failed wind turbines.

FIG. 5 illustrates an exemplary method 500 for assigning a probability of failure to a turbine. Method 500 may be performed by any suitable computing device, including, for example, data analyzer 206 of FIG. 2. Furthermore, it should be appreciated that computing device 300 disclosed herein is not limited to method 500, but may be used to perform other methods consistent with the present disclosure.

Method 500 includes determining 502 a parametric profile for a component of a wind turbine from operating data of a plurality of wind turbines, determining 504 an anomaly profile for the component of the wind turbine from anomaly alerts from a plurality of wind turbines, and determining 506 a probability of failure for the component of the wind turbine based on the parametric profile and the anomaly profile. The parametric profile defines at least one parametric event associated with the component prior to failure of the component, and the anomaly profile defines at least one anomaly associated with the component prior to failure of the component.

In the exemplary embodiment, determining 502 the parametric profile includes analyzing at least one parameter of the component relative to one of an expected value and a set point. In one example, analyzing at least one parameter may include analyzing the at least one parameter based on a turbine status. Further, in some embodiments, determining 502 the parametric profile may include analyzing at least one parameter of the component relative to a second parameter associated with the wind turbine.

In various embodiments, determining 506 the probability of failure includes determining the failure score based on domain knowledge. More specifically, domain knowledge may be employed to determine the parametric profile, to determine the anomaly profile, and/or combine the parametric profile and the anomaly profile to determine the probability of failure. Domain knowledge may include, without limitation, maintenance records, theoretical operations of wind turbine 100, etc.

Additionally, method 500 may include assigning the probability of failure to a wind turbine based on an occurrence of the at least one parametric event and the at least one anomaly.

In several embodiments, determining 504 the anomaly profile includes identifying anomaly alerts associated with the component. Moreover, determining 504 the anomaly profile may include validating the anomaly profile against the anomaly alerts to determine a validation score. Further still, determining 506 the probability of failure may include weighting the anomaly profile based on at least the validation score.

One or more of the above described embodiments may provide accurate predictions of wind turbines failures based on historical operating data and anomaly alerts from a plurality of wind turbines. More specifically, the systems and methods described herein may permit an operator of a turbine farm system to plan outages, maintenance activities, spare parts inventories, and personnel in advance of wind turbine failures, while reducing down time associated with failed wind turbines. Moreover, the systems and methods described herein may provide enhanced management of service offerings and contract management.

Embodiments provided herein facilitate generating one or more probabilities of failure usable to predict a turbine failure prior to the failure. Exemplary embodiments of computing devices and turbine systems are described above in detail. The systems and methods are not limited to the specific embodiments described herein, but rather each component may be utilized independently and separately from other components described herein.

The methods and systems described herein may be implemented using computer programming or engineering techniques including computer software, firmware, hardware or any combination or subset thereof, wherein an exemplary technical effect may include at least one of: (a) determining a parametric profile for a component of a wind turbine from operating data of a plurality of wind turbines, (b) determining an anomaly profile for the component of the wind turbine from anomaly alerts generated by a plurality of wind turbines, and (c) includes determining a probability of failure for the component of the wind turbine based on the parametric profile and the anomaly profile.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-based method for use in predicting a wind turbine component failure, said computer-based method comprising:
    determining, at a computing device, a parametric profile for a component of a wind turbine from operating data of a plurality of wind turbines, the parametric profile defining at least one parametric event associated with the component prior to failure of the component;
    determining, at the computing device, an anomaly profile for the component of the wind turbine from anomaly alerts from a plurality of wind turbines, the anomaly profile defining at least one anomaly associated with the component prior to failure of the component; and,
    determining a probability of failure for the component of the wind turbine based on the parametric profile and the anomaly profile
    wherein the anomaly alerts are generated when a component parameter falls outside of an expected range.

2. The computer-based method of claim 1, wherein determining the parametric profile includes analyzing at least one parameter of the component relative to one of an expected value and a set point.

3. The computer-based method of claim 2, wherein analyzing at least one parameter includes analyzing the at least one parameter based on a turbine status.

4. The computer-based method of claim 2, wherein the at least one parameter includes at least one of voltage, current, power, wind speed, torque, and temperature associated with the wind turbine.

5. The computer-based method of claim 1, wherein determining the parametric profile includes analyzing at least one parameter of the component relative to a second parameter associated with the wind turbine.

6. The computer-based method of claim 1, wherein determining the probability of failure includes determining the probability of failure based on domain knowledge.

7. The computer-based method of claim 6, wherein the domain knowledge includes at least one of a maintenance record for at least one wind turbine and theoretical operation of a wind turbine.

8. The computer-based method of claim 1, further comprising assigning the probability of failure to a wind turbine based on an occurrence of the at least one parametric event and the at least one anomaly.

9. The computer-based method of claim 1, wherein determining the anomaly profile includes identifying the anomaly alerts associated with the component.

10. The computer-based method of claim 9, wherein determining the anomaly profile includes validating the accuracy of the anomaly profile based on the anomaly alerts and selecting the anomaly profile that exceeds a threshold accuracy.

11. The computer-based method of claim 1, wherein the component comprises an electronic component of the wind turbine.

12. The computer-based method of claim 11, wherein determining the anomaly profile includes validating the anomaly profile against the analogy alerts to determine a validation score, and wherein determining the probability of failure includes weighting the anomaly profile based on at least the validation score.

13. A data analyzer for use in predicting a wind turbine component failure, said data analyzer comprising:
    a database including operating data for a plurality of wind turbines and anomaly alerts for a plurality of wind turbines; and,
    a processing device coupled to said database; the processing device configured to:
        determine a parametric profile for a component of a wind turbine from the operating data, the parametric profile defining at least one parametric event associated with the component prior to failure of the component;
        determine an anomaly profile for the component of the wind turbine from the anomaly alerts, the anomaly profile defining at least one anomaly associated with the component prior to failure of the component; and,
        determine a probability of failure for the component of the wind turbine based on the parametric profile and the anomaly profile
    wherein the anomaly alerts are generated when a component parameter falls outside of an expected range.

14. The data analyzer of claim 13, wherein the processing device is configured to identify anomaly alerts associated with the component, validate the accuracy of the anomaly profile based on the anomaly alerts, and select the anomaly profile that exceed a threshold accuracy in order to determine the anomaly profile.

15. The data analyzer of claim 13, further comprising a communication interface for coupling to at least one of a network and a system monitor to receive said operating data and said anomaly alerts.

16. The data analyzer of claim 15, wherein the processing device is configured to assign the probability of failure to a wind turbine based on an occurrence of the at least one parametric event and the at least one anomaly.

17. The data analyzer of claim 15, wherein the at least one parametric event comprises a correlation between a wind speed and a torque output of a wind turbine.

18. One or more non-transitory computer-readable storage media having computer executable instructions embodied thereon, wherein when executed by at least one processing device, said computer executable instructions cause the at least one processing device to:
   determine a parametric profile for a component of a wind turbine from operating data of a plurality of wind turbines, the parametric profile defining at least one parametric event associated with the component prior to failure of the component;
   determine an anomaly profile for the component of the wind turbine from anomaly alerts generated from a plurality of wind turbines, the anomaly profile defining at least one anomaly associated with the component prior to failure of the component; and,
   determine a probability of failure for the component of the wind turbine based on the parametric profile and the anomaly profile
   wherein the anomaly alerts are generated when a component parameter falls outside of an expected range.

19. The one or more non-transitory computer-readable storage media of claim 18, wherein said computer executable instructions cause the at least one processing device to analyze at least one parameter of the component relative to a set point to determine the parametric profile.

20. The one or more non-transitory computer-readable storage media of claim 18, wherein said computer executable instructions cause the at least one processing device to assign the probability of failure to a wind turbine based on an occurrence of the at least one parametric event and the at least one anomaly.

* * * * *